(12) United States Patent
Hayakawa

(10) Patent No.: US 10,795,620 B2
(45) Date of Patent: Oct. 6, 2020

(54) IMAGE PROCESSING APPARATUS AND LAYOUT METHOD

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/378,804

(22) Filed: Apr. 9, 2019

(65) Prior Publication Data

US 2019/0324695 A1    Oct. 24, 2019

(30) Foreign Application Priority Data

Apr. 23, 2018 (JP) ................................ 2018-082418

(51) Int. Cl.
  *G06F 3/12* (2006.01)
(52) U.S. Cl.
  CPC .......... *G06F 3/1208* (2013.01); *G06F 3/1204* (2013.01); *G06F 3/1252* (2013.01); *G06F 3/1257* (2013.01)
(58) Field of Classification Search
  CPC ............................. G06F 3/1208; G06F 3/1204
  See application file for complete search history.

(56) References Cited

U.S. PATENT DOCUMENTS

| | | | |
|---|---|---|---|
| 6,762,860 B1 * | 7/2004 | Watanabe | G06F 21/62 358/403 |
| 7,545,521 B2 | 6/2009 | Hanamoto et al. | |
| 8,493,610 B2 | 7/2013 | Kitagawa et al. | |
| 2002/0167683 A1 | 11/2002 | Hanamoto et al. | |
| 2003/0206316 A1 * | 11/2003 | Anderson | G06T 11/60 358/1.18 |
| 2004/0165000 A1 * | 8/2004 | Nagahashi | G06T 11/60 345/629 |
| 2010/0165113 A1 * | 7/2010 | Abe | G06K 9/6203 348/169 |
| 2010/0206194 A1 * | 8/2010 | Lehner | B41J 13/14 101/474 |
| 2010/0245444 A1 * | 9/2010 | Asai | B41J 2/2054 347/15 |
| 2016/0259604 A1 * | 9/2016 | Hayakawa | G06F 16/532 |
| 2017/0039745 A1 | 2/2017 | Hayakawa | |
| 2017/0187892 A1 * | 6/2017 | Abe | G06F 3/1208 |

(Continued)

FOREIGN PATENT DOCUMENTS

JP    2003-037731 A    2/2003

*Primary Examiner* — Ibrahim Siddo
(74) *Attorney, Agent, or Firm* — Venable LLP

(57) ABSTRACT

Provided is an image processing apparatus comprising: an obtaining unit that obtains images; a division unit that divides the obtained images into groups; a determination unit that determines a template to be used for a processing target group; and a layout unit that lays out the at least one image in the processing target group by using the template determined by the determination unit. In a case where the processing target group includes only a single image, the determination unit determines a first template as the template to be used for the processing target group, the first template including a first slot and a second slot overlapping the first slot. An image arranged in the first slot by the layout unit and an image arranged in the second slot by the layout unit are images based on the single image.

22 Claims, 12 Drawing Sheets

(56) References Cited

U.S. PATENT DOCUMENTS

2018/0167522 A1* 6/2018 Kunieda ............ H04N 1/00167
2018/0218526 A1   8/2018 Hayakawa
2019/0104221 A1   4/2019 Hayakawa

* cited by examiner

TWO-IMAGE TEMPLATE

COORDINATE VALUES OF TWO-IMAGE TEMPLATE

| No | X COORDINATE VALUE | Y COORDINATE VALUE | WIDTH | HEIGHT | IMAGE EDITING |
|---|---|---|---|---|---|
| 1 | 15.0 | 41.0 | 120.0 | 67.5 | N/A |
| 2 | 165.0 | 41.0 | 120.0 | 67.5 | N/A |

(UNIT : mm)

ONE-IMAGE TEMPLATE

COORDINATE VALUES OF ONE-IMAGE TEMPLATE

| No | X COORDINATE VALUE | Y COORDINATE VALUE | WIDTH | HEIGHT | IMAGE EDITING |
|---|---|---|---|---|---|
| 1 | 15.0 | 41.0 | 120.0 | 67.5 | N/A |
| 2 | 40.0 | 0.0 | 260.0 | 150.0 | BLUR |

(UNIT : mm)

ONE-IMAGE TEMPLATE

COORDINATE VALUES OF ONE-IMAGE TEMPLATE

| No | X COORDINATE VALUE | Y COORDINATE VALUE | WIDTH | HEIGHT | IMAGE EDITING |
|---|---|---|---|---|---|
| 1 | 40.0 | 0.0 | 260.0 | 150.0 | N/A |

(UNIT : mm)

IMAGE PROCESSING APPARATUS AND LAYOUT METHOD

BACKGROUND OF THE INVENTION

Field of the Invention

The present invention relates to a technique for laying out a plurality of images in accordance with a template.

Description of the Related Art

There are techniques for automatically creating a photo album. Japanese Patent Laid-Open No. 2003-037731 discloses an automatic layout process that analyzes images in a folder designated by the user, automatically selects images on the basis of the result of the analysis, and lays them out in an album.

SUMMARY OF THE INVENTION

In the case where the automatic layout process is performed, there is a possibility that a single image is allocated to a double-page spread. For example, in a case where a single image is allocated to a single double-page spread as a unit of processing, a layout with a high user satisfaction has not been provided.

An image processing apparatus according to an aspect of the present invention is comprises: an obtaining unit configured to obtain a plurality of images; a division unit configured to divide the obtained plurality of images into a plurality of groups; a determination unit configured to determine a template to be used for a processing target group; and a layout unit configured to lay out at least one image included in the processing target group by using the template determined by the determination unit. In a case where the processing target group includes only a single image, the determination unit determines a first template as the template to be used for the processing target group, the first template including a first slot and a second slot overlapping the first slot. An image arranged in the first slot by the layout unit and an image arranged in the second slot by the layout unit are images based on the single image.

Further features of the present invention will become apparent from the following description of exemplary embodiments with reference to the attached drawings.

DESCRIPTION OF THE EMBODIMENTS

Preferred embodiments of the present invention will be specifically described with reference to the accompanying drawings. Note that the following embodiments do not limit the present invention according to the claims, and not all the combinations of the features described in these embodiments are necessarily essential for a solution provided by the present invention.

Embodiment 1

Figure 1:
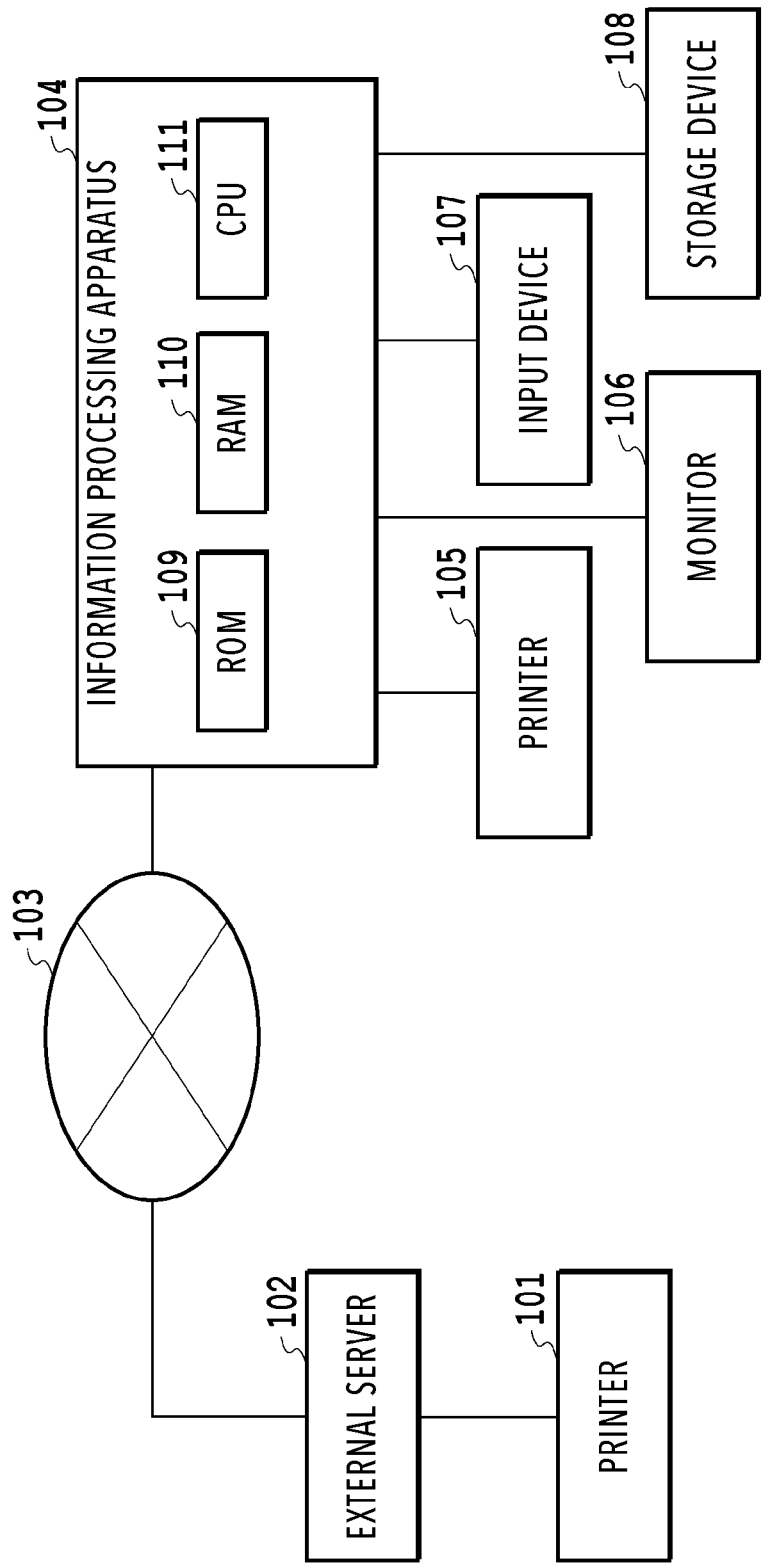
FIG. 1 is a system configuration diagram.

<System Configuration>
FIG. 1 is a diagram illustrating the configuration of a system including an information processing apparatus 104 as an image processing apparatus to be used in this embodiment. The image data 104 is an album data generation apparatus capable of generating album (photo album, photo book) data from inputted pieces of image data. Various types of information processing apparatuses, such for example as a personal computer, a smartphone, and a tablet, can be used as the image processing apparatus 104. The information processing apparatus 104 can output the generated album data as print data, upload it to an external server, and perform other similar operations.

The information processing apparatus 104 includes an ROM 109, an RAM 110, and a CPU 111. The information processing apparatus 104 also includes input-output interfaces (not illustrated) to be connected to a printer 105, a monitor 106, an input device 107, a storage device 108, and a network 103. The CPU 111 is a central processing unit, and takes overall control of the information processing apparatus 104 by running an operating system program (hereinafter referred to as the OS) stored in the storage device 108, the ROM 109, the RAM 110, or the like. Also, the CPU 111 reads out a program stored in the ROM 109 into the RAM 110 and executes it to perform operations such as implementation of functional components in the information processing apparatus 104, computation and processing of information, and control of pieces of hardware. The ROM 109 is a read-only memory and stores a plurality of programs. The RAM 110 is a random access memory and is used as a work memory for the CPU 111.

The network 103 is connected to the information processing apparatus 104 and an external server 102. The network 103 is a communication network through which to transfer information. The external server 102 includes an input-output interface (not illustrated) to be connected to a printer 101. The printer 101 is connected to the external server 102. Album data generated by the information processing apparatus 104 is uploaded to the external server 102 through the network 103. In a case where it is possible to perform printing using the uploaded album data, the external server 102 outputs the album data to the printer 101. The external server 102 is an album order entry and management server, for example. An album created by the information processing apparatus 104 is uploaded to the external server 102, and the album is outputted from the printer 101 on condition that the user completes the necessary album purchase procedure. The printed products thus outputted will be bound into a book and delivered to the user.

The printer 105 is a printer that prints a print target generated by the information processing apparatus 104. Depending on the usage environment, the user may print a created album with the printer 105, owned by the user, and bind the printed products into an album. The monitor 106 is a display device that displays image information outputted from the information processing apparatus 104. The input device 107 is such an input device as a keyboard and/or a pointing device for inputting information into the information processing apparatus 104. Depending on the form of the input device, it may be a device integrated with a monitor and configured to allow an input operation via direct touch on the monitor. The storage device 108 is such a storage device as an HDD or SSD that stores image data, templates, and so on.

Although the monitor 106, the input device 107, and the storage device 108 are illustrated as devices separate from the information processing apparatus 104 in FIG. 1, they may be included in the information processing apparatus 104. In this case, the storage device 108 and the RAM 110 in the information processing apparatus may serve as the same entity.

<Configuration of Information Processing Apparatus>

Figure 2:
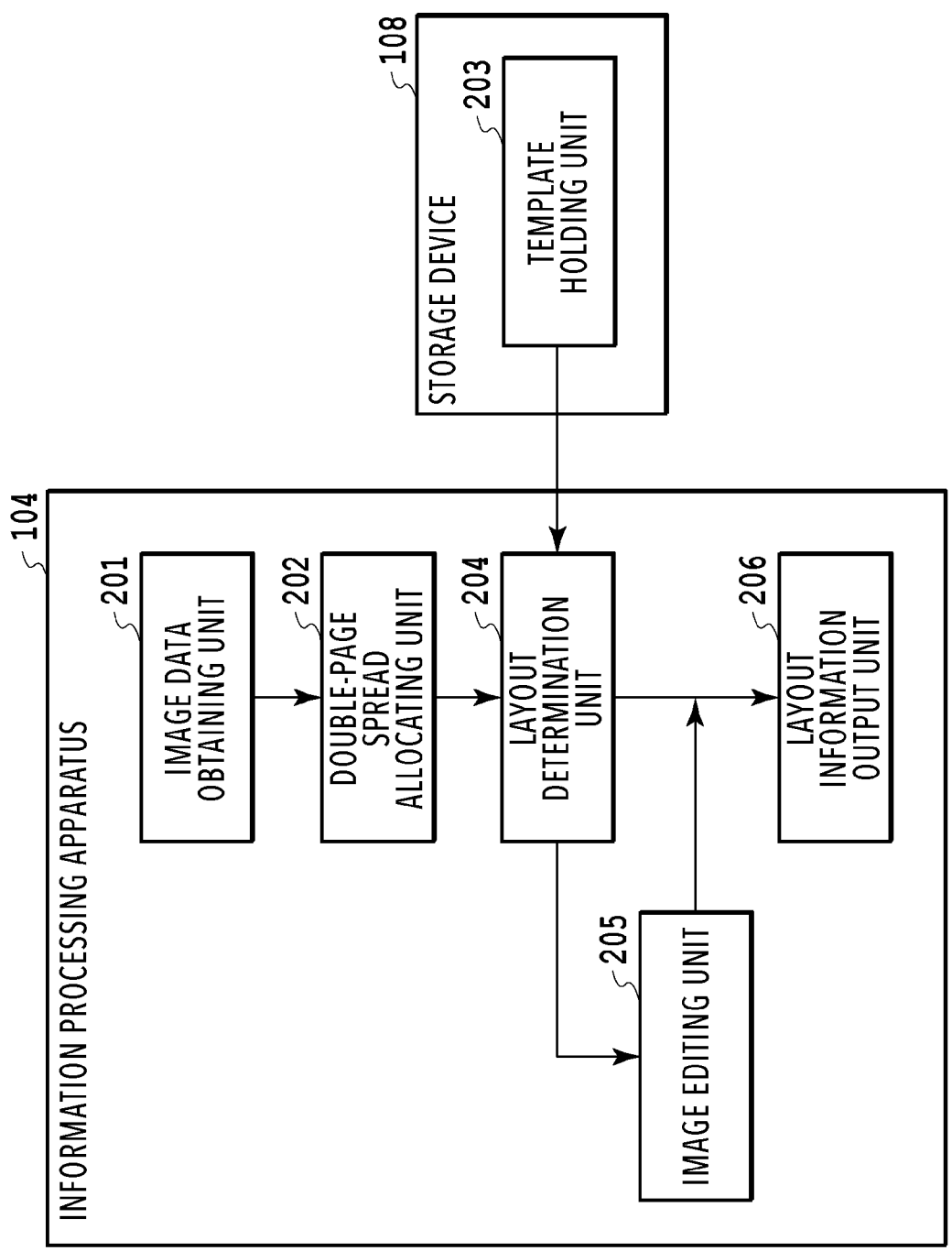
FIG. 2 is a functional configuration diagram of an information processing apparatus.

FIG. 2 is a diagram illustrating an example of the functional configuration of the information processing apparatus 104 in this embodiment. The information processing apparatus 104 includes an image data obtaining unit 201, a double-page spread allocating unit 202, a layout determination unit 204, an image editing unit 205, and a layout information output unit 206. The CPU 111 implements each unit illustrated in FIG. 2 by reading out a program stored in the ROM 109 into the RAM 110 and executing it. The storage device 108 includes a template holding unit 203. Note that the storage device 108 (template holding unit 203) may be included in the information processing apparatus 104, as mentioned above.

The image data obtaining unit 201 obtains pieces of image data for use in album creation. For example, the image data obtaining unit 201 displays thumbnails of images on the monitor 106 and has the user select a plurality of images the user wishes to lay out in an album.

Figure 3:
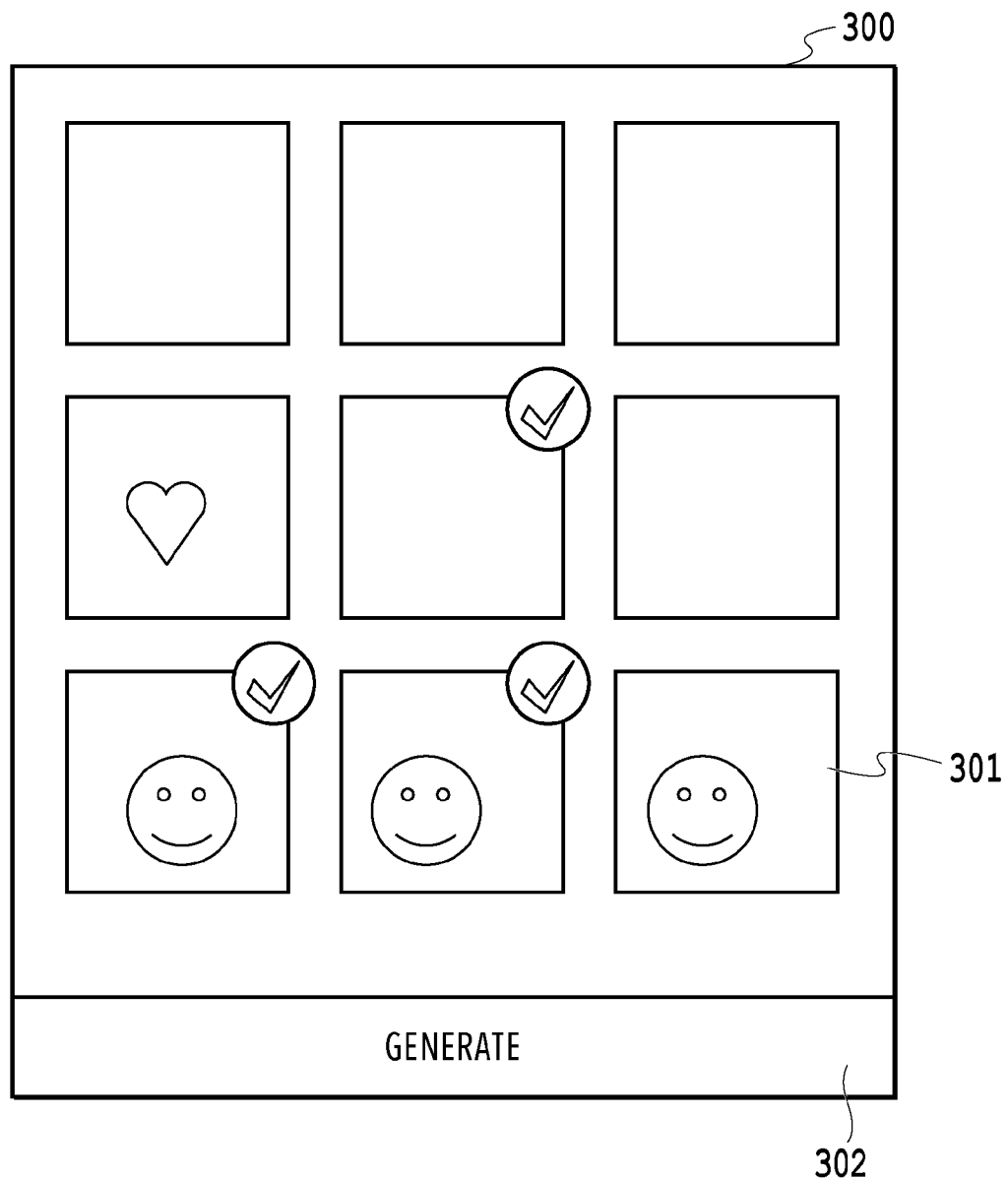
FIG. 3 is a diagram of an UI screen for selecting images.

FIG. 3 is a diagram illustrating an example of a UI screen 300 on which the user selects images. The user checks thumbnails 301 displayed on the UI screen 300 and selects images the user wishes to lay out. The user then presses a generate button 302. In response, the image data obtaining unit 201 generates an image list using the images selected by the user. Note that the image data obtaining unit 201 may not be configured to have the user select images one by one, as with the UI screen 300 in FIG. 3. For example, the image data obtaining unit 201 may have the user select a folder as used in a common OS and generate an image list from all images stored in the folder.

The double-page spread allocating unit 202 divides the images in the image list into a plurality of groups. Specifically, the double-page spread allocating unit 202 allocates one or more images to each double-page spread in the album from among the images in the image list. A single double-page spread corresponds to two pages in the state where the album is created. In the created album, a single double-page spread is divided into two upper and lower pages or two right and left pages by the binding part of the double spread. In a case where the number of double-page spreads in an album to be created is 20 pages for example, the double-page spread allocating unit 202 determines the one or more images to be allocated to each of the 20 double-page spreads on the basis of a predetermined criterion. Note that this embodiment is not limited to the example where the number of divisions of the plurality of images (number of groups) is equal to the number of double-page spreads. Groups may be allocated on a page-by-page basis. In other words, the images may be divided into a plurality of groups on the basis of the number of pages. Nonetheless, due to the nature of album, a higher user satisfaction can be achieved by arranging photographs of the same event on a single double-page spread. It is therefore preferable to divide the images into a plurality of groups on the basis of the number of double-page spreads.

The template holding unit 203 holds groups of candidate templates for use in layout of albums. The groups of candidate templates are stored in the storage device 108, for example. Each group of candidate templates is a set of templates for one of the divided groups (one of the double-page spreads in this embodiment). For each single group of images, a template designed for the number of images in the group among the groups of candidate templates is used. For example, in a case where the number of images to be allocated to a first double-page spread is one, a template in a group of one-image candidate templates is used. In a case where the number of images to be allocated to the first double-page spread is three, a template in a group of three-image candidate templates is used.

The layout determination unit 204 determines the template to be used for the processing target double-page spread from the group of candidate templates for the number of images allocated to the processing target double-page spread. Then, the layout determination unit 204 performs a layout process to arrange the corresponding one or more images on the processing target double-page spread in accordance with the determined template.

The image editing unit 205 performs at least one editing process among a blurring process, a transparency process, a gradient mask process, a line art process, and a halftone process. In this embodiment, the image editing unit 205 performs the editing process on the arranged images if necessary.

The layout information output unit 206 outputs data (e.g. bitmap data) on each double-page spread with one or more images arranged thereon by the layout determination unit 204 to the outside.

<Flowchart>

Figure 4:
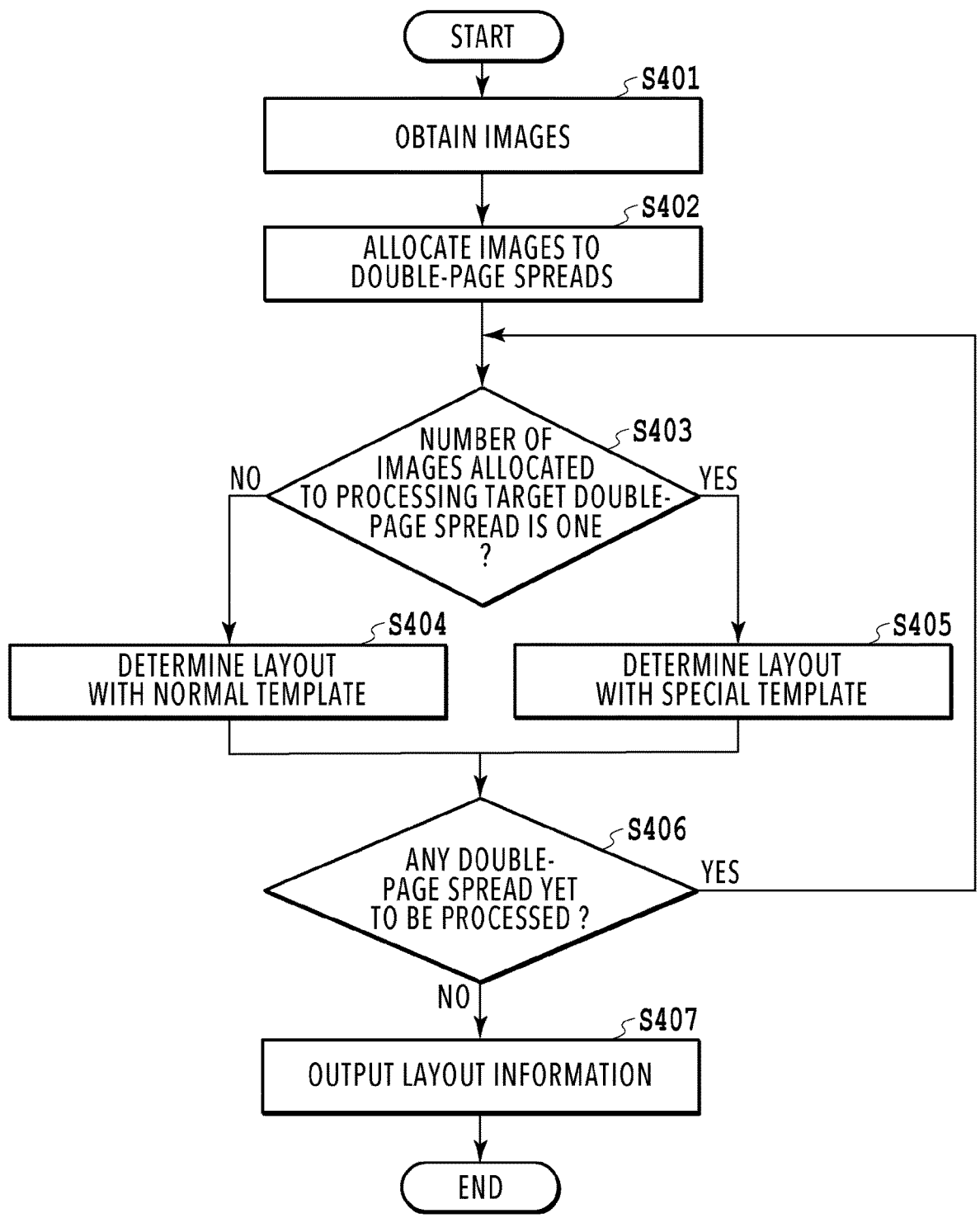
FIG. 4 is a flowchart of a layout determination process.

FIG. 4 is a diagram illustrating an example of a flowchart of a layout determination process in this embodiment. The CPU 111 performs the series of processes illustrated in the flowchart of FIG. 4 by deploying program code stored in the ROM 109 to the RAM 110 and executing it. Alternatively, the functions of some or all of the steps in FIG. 4 may be implemented with hardware such as an ASIC or an electronic circuit. Meanwhile, the symbol "S" in the description of each process means a step in the flowchart.

In S401, the image data obtaining unit 201 obtains the pieces of image data of images selected by the user through the UI screen 300. The image data obtaining unit 201 generates an image list from the obtained pieces of image data.

The image data obtaining unit 201 may add all images selected by the user to the image list. Alternatively, for each image selected by the user, the image data obtaining unit 201 may determine whether the image is suitable for the photo album, select only suitable images, and add them to the image list. For example, the image data obtaining unit 201 may determine an image with an extremely small or large image width or height as not suitable for the photo album, and may not add it to the image list. Also, in a case where the aspect ratio of an image does not match any of the templates held in the template holding unit 203 or other similar cases, the image data obtaining unit 201 may not add that image to the image list. Moreover, the image data obtaining unit 201 may determine whether an image is suitable for the photo album by using, for example, the save format of the image or the color space of the image.

In S402, the double-page spread allocating unit 202 divides the images included in the image list generated in S401 into a plurality of groups. In this example, the double-page spread allocating unit 202 allocates one or more of the images included in the image list to each of a predefined number of double-page spreads.

For example, in a case where the number of double-page spreads in a photo album that can be generated by the photo album creation application is fixed at 10, the double-page spread allocating unit 202 divides the plurality of images into 10 groups. The user may select the number of double-page spreads. For example, the user may select the number of double-page spreads with a UI (not illustrated). The double-page spread allocating unit 202 divides the plurality of images included in the image list into as many groups as the number of double-page spreads. The allocation of the images to the double-page spreads, i.e. the division of the images for the double-page spreads, may be done by evenly dividing the image list. In the case of evenly dividing the image list in a situation where the number of images in the image list is 19 and the number of double-page spreads is 10, the image list is divided into 10 groups and there is a single double-page spread on which a single image is to be laid out. Note that the images may not be evenly divided. For example, the image capture interval between adjacent images may be calculated from their image capture dates and times; then, the images may be divided into groups starting from points where the image capture interval is large, and these groups may be allocated. Meanwhile, there can be a case where the user wishes to make a single collage print with images laid out thereon, instead of a photo album. In this case, the number of double-page spreads is one, and the images in the image list generated in S401 are laid out on a single double-page spread.

In S403, the layout determination unit 204 checks the number of images allocated to the target double-page spread for the layout process. If a single image is allocated, the flow proceeds to S405. If two or more images are allocated, the flow proceeds to S404.

In S404, the layout determination unit 204 determines the layout of the processing target double-page spread by using a normal template. For example, in a case where the number of images allocated to the processing target double-page spread is two, the layout determination unit 204 determines the layout by using a two-image template.

Figures 5A, 5B:
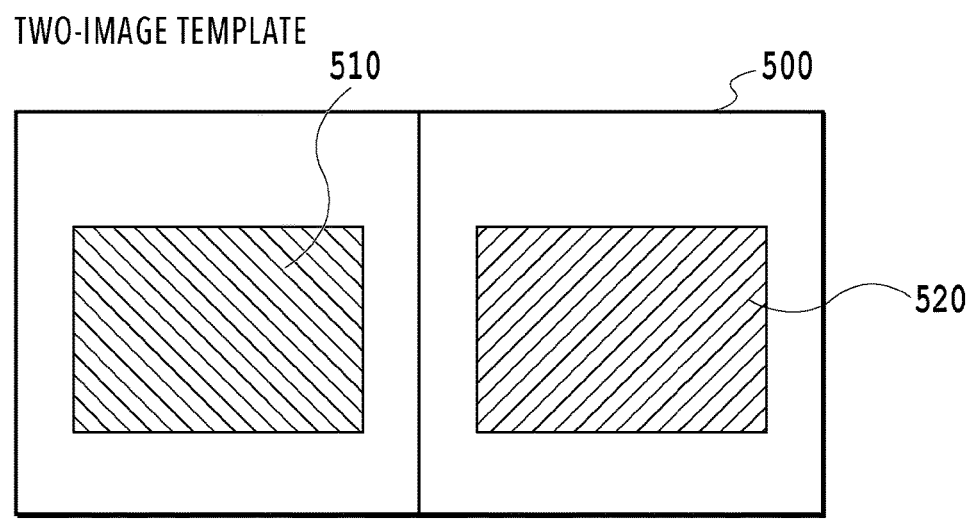
FIGS. 5A and 5B are diagrams explaining a normal template.

FIGS. 5A and 5B are diagrams explaining an example of the normal template. FIG. 5A is a normal template 500 for two images. FIG. 5B is a diagram listing the coordinate values of image slots 510 and 520 in the normal template 500 in FIG. 5A. While FIGS. 5A and 5B illustrate only one template, the group of two-image templates includes a plurality of templates differing in image slot size, position, aspect ratio, angle, and the like. Each template contains the number, widths, and heights of slots in which to arrange an image, the positions of the slots in a double spread, layer information indicating the order in which the slots overlap each other, and slot numbers for identifying the slots in the template.

The layout determination unit 204 follows predetermined conditions to determine the template and arrange the images. For example, the layout determination unit 204 may determine the template with the closest image-slot aspect ratios to the aspect ratios of the images allocated to the processing target double-page spread. Also, the layout determination unit 204 may arrange the images on the determined template in chronological order based on the image capture dates and times of the images. The layout determination unit 204 may determine the arrangement of the images at random. The layout determination unit 204 may determine the arrangement of the images on the basis of scores obtained from the result of an image analysis on the images.

Although FIGS. 5A and 5B illustrate an example of the two-image template, the template holding unit 203 holds templates, as normal templates, having as many image slots as the minimum number of images that can be laid out on a single double-page spread to templates having as many image slots as the maximum number of images that can be laid out on a single double-page spread. In S404, the image layout unit 204 determines a template for the number of images allocated to the processing target double-page spread and arranges images. There is a possibility that the template for the number of allocated images is not held in the template holding unit 203. In such a case, a template may be determined using a predetermined criterion, and images may be arranged in chronological order, and any remaining image(s) may not be arranged. Alternatively, on the basis of scores obtained by an image analysis, images may be arranged in descending of the score, and any remaining image(s) may not be arranged. Meanwhile, an upper limit may be set for the number of images to be selected by the user in S401. In this way, the number of images selected by the user can be limited to be not more than the number of image slots in any of the templates held in the template holding unit 203.

In S405, the layout determination unit 204 determines the layout of the processing target double-page spread by using a special template.

Figures 6A, 6B:
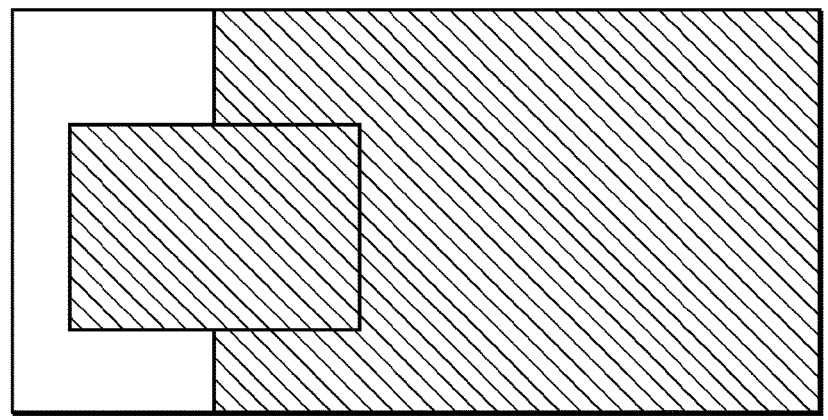
FIGS. 6A and 6B are diagrams explaining a special template.

FIGS. 6A and 6B are diagrams explaining the special template. FIG. 6A illustrates a special template 600 for one image. FIG. 6B is a diagram listing the coordinate values of images slots in the special template 600 in FIG. 6A. The special template 600 in this embodiment is a one-image template but is provided with two image slots 610 and 620. The special template 600 contains a designation as an instruction to arrange the same image. There is only one image allocated to the processing target double-page spread. The layout determination unit 204 therefore arranges the same image in the two image slots 610 and 620. Note that the same image means that the images in the two image slots 610 and 620 are the same piece of image data obtained by the image data obtaining unit 201. Specifically, the same image means that the source images are the same. Thus, the images arranged in the image slot 610 and the image slot 620 may differ from each other after processes such as an enlargement process and a trimming process, for example.

The special template 600 includes the image slot 610, arranged at a first region, and the image slot 620, arranged at a second region. The image slot 620 is larger in size than the image slot 610. Also, at least a part of the image slot 620 and at least a part of the image slot 610 overlap each other. At the overlapping region, the image slot 610 is arranged on top of the image slot 620. In other words, the image slot 620 is a background image slot while the image slot 610 is a foreground image slot. Information on overlap of each slot may be obtained from the layer information contained in the template, and the bottom layer may be determined as the background slot. Also, in a case where particular layer information is set for a slot, it may be assumed the slot is a background slot overlapping another slot(s).

Note that although FIGS. 6A and 6B illustrate the special template 600, containing two image slots, a template containing three or more image slots may be used instead. In this case too, the same image is arranged in the three or more image slots. In this embodiment, only a single one-image template is prepared. However, it is possible to employ a mode in which, as in S404, a plurality of one-image templates are prepared and a suitable template is selected from among them. The layout determination unit 204 may determine the special template to be used from among a plurality of special templates differing from each other in size, position, angle, and the like of the foreground image slot and the background image slot.

In S406, the layout determination unit 204 determines whether there are one or more double-page spreads yet to be processed. If there are one or more double-page spreads yet to be processed, the flow returns to S403 and the processes are repeated. If there is no double-page spread yet to be processed, the flow proceeds to S407.

In S407, the layout information output unit 206 outputs bitmap data of each double-page spread with images arranged thereon as layout information to the outside. The process is then terminated.

As described above, in this embodiment, in the case where the number of images allocated to the processing target double-page spread is one, the layout determination unit 204 determines a special template as the template for the processing target double-page spread. Specifically, the layout determination unit 204 determines a template that allows a single image to be arranged in two image slots in a double-page spread as the template for the processing target double-page spread. Using such a template makes it possible to provide a layout that gives a different impression from existing layouts even in the case where the number of images allocated to the double-page spread is one. Also, in the layout process in this embodiment, a single image is laid out in both a background slot and a foreground slot. Specifically, the image region in the background slot covered by the foreground slot is displayed in the foreground slot. Thus, as the user views the created album, the user does not feel that the image in the background slot is missing a piece. It is therefore possible to provide a layout with high user satisfaction.

Also, in this embodiment, description has been given of an example where the flow proceeds to S405 if the number of images allocated to the double-page spread is one. However, the number of images allocated to the double-page spread is not limited to one, but may be changed in accordance with the layout pattern. For example, while it is easy to arrange images evenly on the left and right sides in a case where the number of images is an even number, the arrangement is uneven and the size of a particular image slot is likely to be large in a case the number of images is an odd number. With such cases taken into consideration, the flow may proceed to S404 if the number of images is an even number and proceed to S405 if the number of images is an odd number.

<Modification>

Next, an example where an image editing process by the image editing unit 205 is performed will be described as a modification. As illustrated in FIG. 6B, there are cases where the special template 600 contains an image editing instruction. Not only the special template 600 but the normal template 500, illustrated in FIGS. 5A and 5B, may contain an image editing instruction(s). In the example of FIG. 6B, a blurring process is designated as the image editing instruction for the background image slot 620 in the special template 600.

In the case where the template to be used contains an instruction for particular image editing, the layout determination unit 204 transfers the image editing instruction, the coordinates of the image slot 620, and the image data to the image editing unit 205. Upon receipt of these, the image editing unit 205 performs the image editing. For example, in the case of using the special template 600 in FIGS. 6A and 6B, the image editing unit 205 depicts an image on the image slot 620, which is the background image slot, while performing a blurring process only on the image to be arranged in the background image slot.

Figure 7:
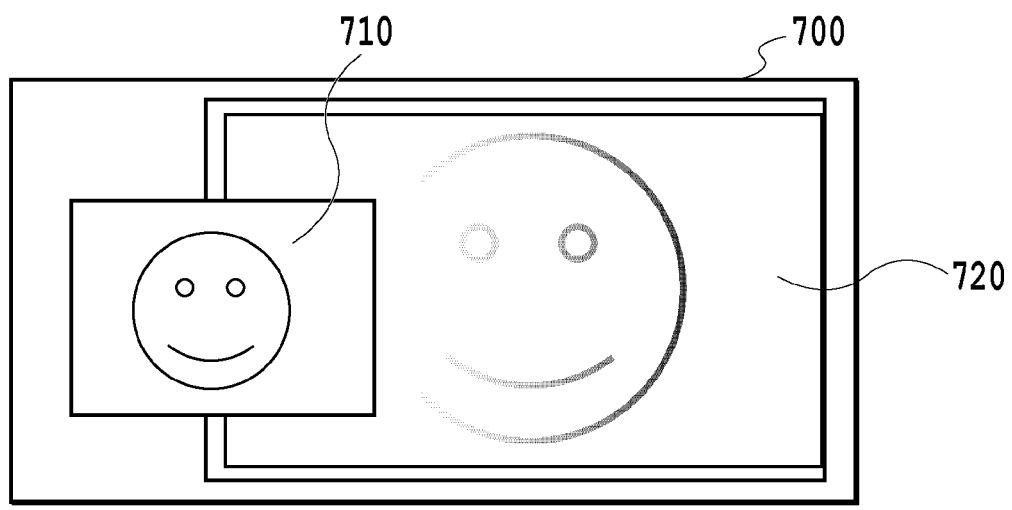
FIG. 7 is a diagram of images laid out.

A double-page spread 700 in FIG. 7 is a diagram of a foreground image 710 and a background image 720 arranged in accordance with the special template 600 in FIGS. 6A and 6B. The background image 720 has been subjected to the blurring process. A reason for performing image editing only on the background image 720 as mentioned will be described. As illustrated in FIGS. 6A and 6B, in the special template 600, the background image slot 620 is larger in size than the foreground image slot 610. Thus, the image is often laid out enlarged. In this case, depending on the original image size, an image below an appropriate print resolution may possibly be arranged. If the image below the appropriate print resolution is arranged, jaggies are formed, which make visible the pixels of the object's contour in the image. In the modification of this embodiment, image editing is performed to prevent the jaggies. Although a blurring process is performed in the example illustrated in FIG. 7, any image editing may be employed as long as it makes jaggies visually unrecognizable. For example, it is possible to employ a transparency process, a gradient mask process, a line art process, a halftone process, or the like. Another reason will be described. In the case where the number of images laid out on a double-page spread is one, performing image editing may cause problems such as missing a part of the original image. Consequently, the whole original image cannot be viewed. However, in this modification, image editing is performed only on the background image 720 and no image editing is performed on the foreground image 710. Thus, by viewing the foreground image 710, it is possible to check the original image. By arranging the original image as the foreground image 710 and arranging an image subjected to image editing as the background image 720 as mentioned above, it is possible to provide an artistic layout as if designed by a designer.

Embodiment 2

In embodiment 1, description has been given of a mode in which a template that allows a single image to be arranged in the two or more image slots in a double-page spread is used in the case where the number of images allocated to the double-page spread is one. Description has been given also of a mode in which a predetermined editing process is performed on the image arranged in the background image slot.

In this embodiment, description will be given of a mode in which a message such as a warning is outputted in a case where the print resolution of any image is below a predetermined threshold. The threshold for outputting a warning is changed to a lower value for the image arranged in the background image slot. In this way, a warning is less likely to be outputted even in the case where the special template 600 is used and image enlargement lowers the resolution.

Note that this embodiment assumes that an editing process is performed as described in the modification of embodiment 1.

<Configuration of Information Processing Apparatus>

Figure 8:
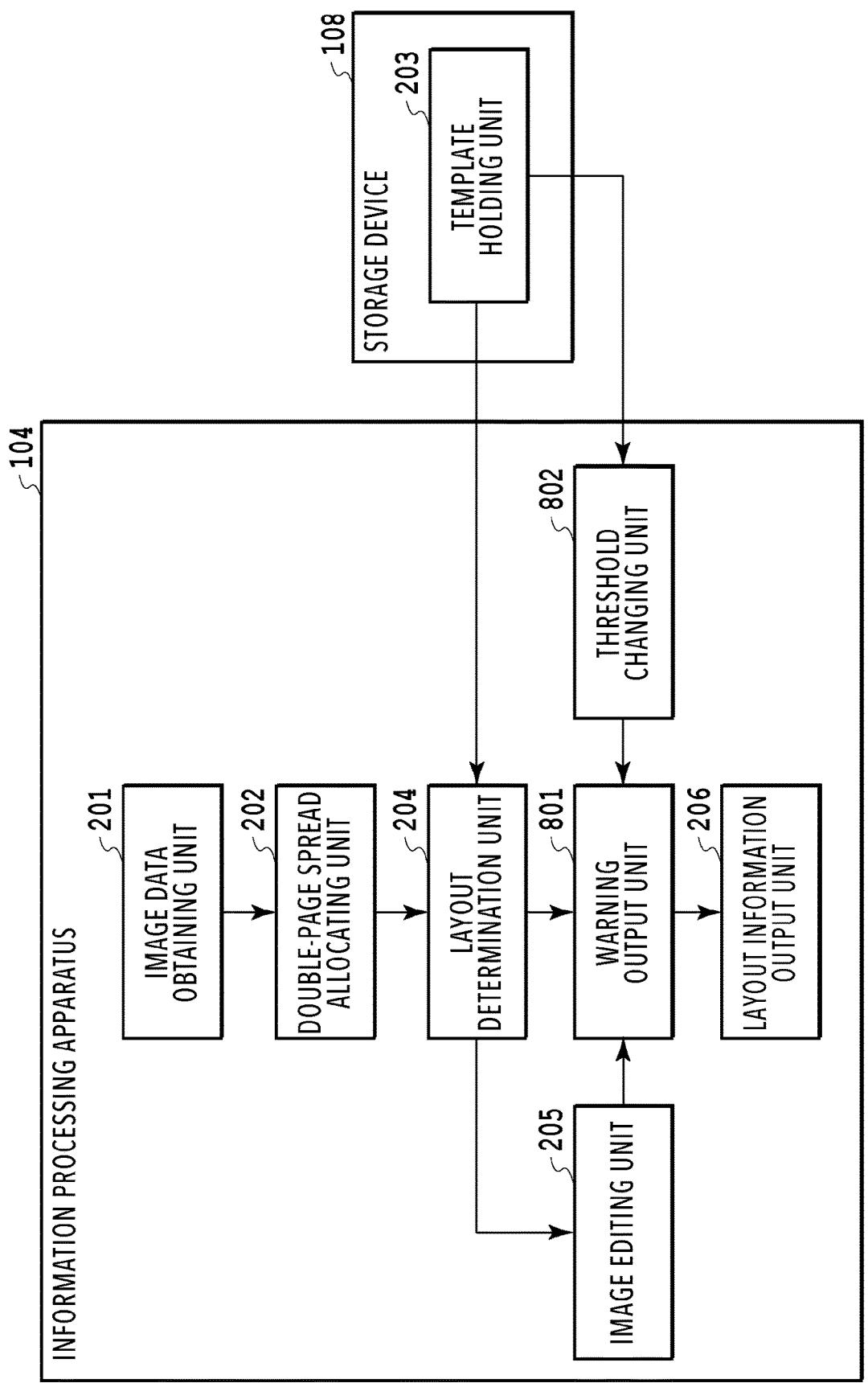
FIG. 8 is a functional configuration diagram of an information processing apparatus.

FIG. 8 is a diagram illustrating an example of the functional configuration of an information processing apparatus 104 as an image processing apparatus in this embodiment. In addition to the configuration described in embodiment 1, the information processing apparatus 104 further includes a warning output unit 801 and a threshold changing unit 802. The other features of the configuration are similar to the configuration described in embodiment 1, and description thereof is therefore omitted.

The warning output unit 801 outputs a warning in a case where the resolution of any image arranged on a double-page spread is below a first threshold. For example, 200 dpi is set as the first threshold. In the case where the print resolution is below this threshold, the possibility of formation of jaggies in the printed image is high. For this reason, in the case where the resolution of any image is below the first threshold, the warning output unit 801, for example, notifies the monitor 106 of a message about the resolution. Note that in the case where the double-page spread contains a plurality of image slots, the warning output unit 801 checks the resolution of the image in each image slot and outputs a warning as appropriate.

The threshold changing unit 802 changes the first threshold to be used by the warning output unit 801 in accordance with the template to be used for the double-page spread. In the case of using, for example, the special template 600 in FIGS. 6A and 6B, a blurring process is performed on the background image slot 620. Although the resolution is decreased, this blurring process makes the jaggies visually unrecognizable. Thus, for image slots as in the special template 600 containing an image editing instruction, the threshold changing unit 802 lowers the threshold to be used by the warning output unit 801 and thereby makes a warning less likely to be outputted. In sum, whether to output a warning is determined using a second threshold which is a lower threshold than the first threshold. Such a configuration prevents a print resolution warning from being outputted frequently even though an automatic layout process is performed.

The print resolution is calculated from equation 1 below on the basis of the size of the image to be arranged and the size of its image slot.

$$\text{Print resolution} = \text{Image size [px]} \times 25.4 \div \text{Image slot size [mm]} \quad \text{(Equation 1)}$$

The image size and the image slot size are specified by the width and the height. Thus, the print resolution is calculated for each of the width and the height. In this embodiment, the print resolution refers to the smaller of the printing resolution obtained from the width and the print resolution obtained from the height.

<Print Resolution Warning Process>

Figure 9:
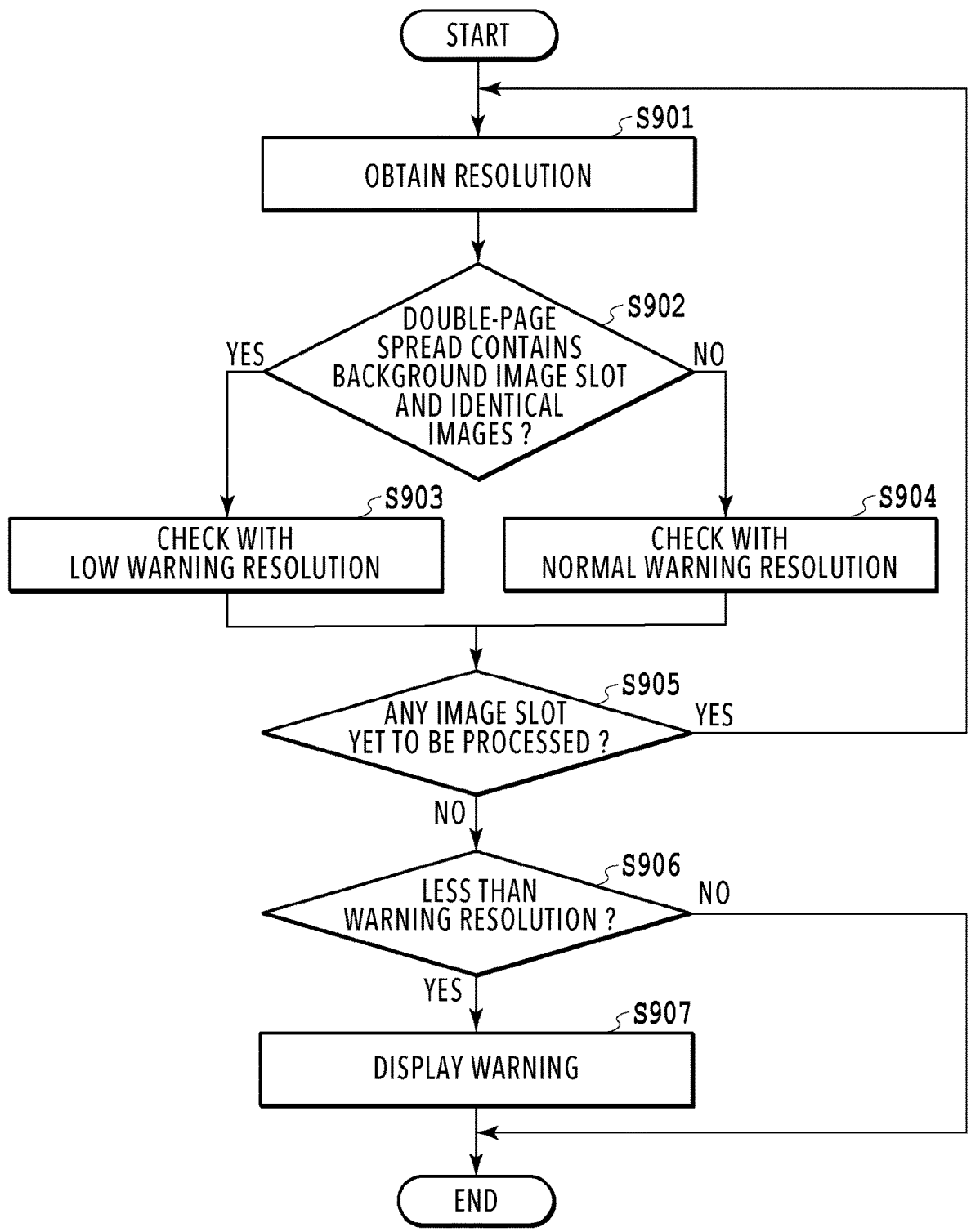
FIG. 9 is a flowchart of a process of outputting a print resolution warning.

FIG. 9 is a flowchart illustrating a process of outputting a print resolution warning before printing in this embodiment. The process in FIG. 9 is performed by the warning output unit 801 and the threshold changing unit 802. The process illustrated in FIG. 9 represents contents processed in a case where the user issues a print instruction after the layout of each double-page spread in an album is determined by the process illustrated in FIG. 4. For example, the process illustrated in FIG. 9 is executed before a photo album with images laid out is printed by the printer 105 or the printer 101, connected to the network 103, after a print button on a UI (not illustrated) is pressed. The process in FIG. 9 is performed for each double-page spread.

In S901, the warning output unit 801 obtains the print resolution of the image arranged in the processing target image slot. In a case where the print resolution has been calculated in advance, the warning output unit 801 may obtain that value. Alternatively, the warning output unit 801 may calculate the print resolution of the image arranged in the processing target image slot on the basis of the size of the processing target image slot and the image arranged in that image slot. For example, the warning output unit 801 can use equation 1 to calculate the print resolution.

In S902, the warning output unit 801 determines whether the processing target image slot is a background image slot and also whether the image arranged in the processing target image slot is arranged also in another image slot(s) in the double-page spread. For example, the warning output unit 801 can make the above determination by referring to the template used for the double-page spread. For example, the warning output unit 801 may obtain the information on overlap of each slot from the layer information among the pieces of information contained in the template used for the double-page spread, and determine the bottom layer as the background slot. Also, in a case where particular layer information is set, the processing target image slot may be determined as a background slot overlapping another slot(s). In a case where, for example, the special template 600, described with reference to FIGS. 6A and 6B, is used and the image slot 620 is the processing target image slot, the result of the above determination is Yes. Note that the above determination may be made by analyzing the images laid out on the double-page spread.

If the processing target image slot is a background image slot and the image arranged in the processing target image slot is arranged also in another image slot(s) in the double-page spread, the flow proceeds to S903. Otherwise, the flow proceeds to S904.

In S903, the threshold changing unit 802 changes the threshold to be used by the warning output unit 801 to the second threshold, which is a lower threshold than the first threshold. The warning output unit 801 determines whether the print resolution obtained in S901 is less than the second threshold. If the print resolution is less than the second threshold, the warning output unit 801 sets a resolution warning flag. The second threshold is 100 dpi, for example.

In S904, the warning output unit 801 checks the print resolution by using the first threshold, which is a normal warning resolution. Specifically, the warning output unit 801 determines whether the print resolution obtained in S901 is less than the first threshold. If the print resolution is less than the first threshold, the warning output unit 801 sets a print resolution warning flag. As mentioned earlier, the first threshold is 200 dpi.

In S905, the warning output unit 801 determines whether there are one or more image slots yet to be processed. If there are one or more image slots yet to be processed, the flow returns to S901 and the processes are repeated. If the processes have been finished for all image slots, the flow proceeds to S906.

In S906, the warning output unit 801 determines whether there is any image slot below the warning resolution. If a resolution warning flag has been set in S903 or S904, the warning output unit 801 determines that there is an image slot below the warning resolution. If there is an image slot below the warning resolution, the flow proceeds to S907.

Figure 10:
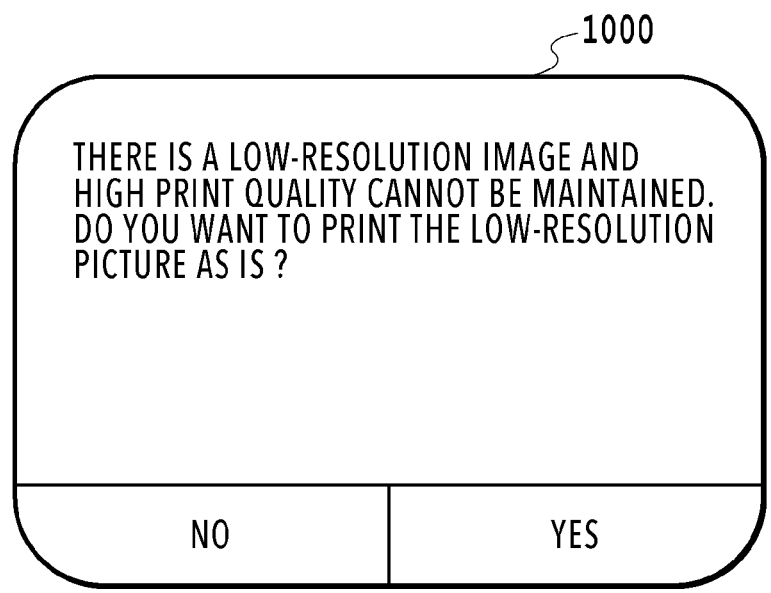
FIG. 10 illustrates a display example of a warning message.

In S907, the warning output unit 801 displays a warning message indicating that an image below the warning resolution is contained. For example, the warning output unit 801 displays a UI screen 1000 illustrated in FIG. 10 on the monitor 106, and the process is terminated. In other words, the warning output unit 801 confirms with the user whether printing should be performed although an image below the warning resolution is contained.

On the other hand, if it is determined in S906 that there is no image slot under the warning resolution, it means that none of the images arranged in the image slots in the processing target double-page spread has a problematic print resolution. The process is therefore terminated.

In this embodiment, if the processing target image slot is a background image slot and the image arranged in the processing target image slot is arranged also in another image slot(s) in the double-page spread, the print resolution is checked using the second threshold. In this way, a warning message is prevented from being displayed even through the image arranged in the background image slot has been subjected to an editing process to suppress jaggies as described in the modification of embodiment 1.

Note that in this embodiment, the condition for the determination in S902 is that the processing target image slot is a background image slot and the image arranged in the processing target image slot is arranged also in another image slot(s) in the double-page spread. However, the condition is not limited to this example. For instance, the user may possibly change the image editing designated for the background image slot through an editing operation. To enable an appropriate warning process in such a case, the flow may proceed to S903 on condition that the target image slot is a background image slot and image editing has been designated.

Also, in this embodiment, description has been given of a mode in which, if YES in the determination in S902, it is determined whether the print resolution is less than the second threshold. Here, the second threshold may not be a fixed value. For example, in a case where the user can change the image editing through an editing operation after the layout is determined by the layout determination unit 204, the second threshold may be changed in accordance with the image editing process applied. For example, the second threshold may be set to 100 dpi in a case where image editing that does not greatly change the original image, such as a blurring process or a transparency process, is designated. The second threshold may be set to 50 dpi in a case where image editing that greatly changes the original image, such as a line art process or a halftone process, is designated. Also, in a case where the amount of blur in a blurring process or the like can be adjusted using a parameter, the second threshold may be variable in accordance with the amount of blur.

Also, in this embodiment, description has been given of a mode in which the process in FIG. 9 is performed before printing. However, the present invention is not limited to this mode. The process in FIG. 9 may be performed after the layout is determined or after an editing operation. In this case, it is desirable to indicate to the user that an image below the warning resolution has been set by attaching an icon to or coloring the image slot below the warning resolution, instead of displaying the UI screen 1000 in FIG. 10.

By the above process, it is possible to check whether there is an image below the warning print resolution on the basis of an appropriate determination criterion before printing the images laid out.

Specific Example

This embodiment will be supplementally described by using a specific example. Assume a situation where a single image of 1920×1080 px (pixel) has been allocated to a double-page spread P1 and the layout is to be determined prior to performing above-described process. In the layout determination process in FIG. 4, the layout of the double-page spread P1 is determined using the special template 600, as described in S405. As illustrated in FIG. 6B, in the special template 600, the size of the foreground image slot 610 is 120×67.5 mm and the size of the background image slot 620 is 260×150 mm.

In a case of performing printing in this state, the print resolution is obtained in S901. The obtained resolution of the foreground image slot 610 is 406 dpi. The obtained resolution of the background image slot 620 is 188 dpi.

Without following the process in FIG. 9, the resolution of the background image 620 is determined as less than the first threshold, or 200 dpi, which is the normal warning resolution. Consequently, a print resolution warning is displayed even though an automatic layout process is performed.

In contrast, by following the process in FIG. 9, the double-page spread P1 is processed such that the determination in S902 is YES. This is because the same image has been arranged in the foreground image slot 610 and in the background image slot 620 by the special template 600 in S405. Thus, the flow proceeds to S903, in which the print resolution obtained in S901 is compared with the second threshold, or 100 dpi, which is lower than the first threshold, or 200 dpi. As a result, the double-page spread P1 will be printed without displaying a print resolution warning. Also, as described in the modification of embodiment 1, the image editing, namely a blurring process, has been performed on the background image as a result of the process using the special template 600 in S405. Hence, although the print resolution is less than the first threshold, or 200 dpi, jaggies are not visually recognizable.

Assume that, in the above specific example, after the layout of the double-page spread P1 is determined, the user performs an editing operation to enlarge and trim a part of the image in the background image slot, so that the print resolution is decreased to below 100 dpi. In this case, the print resolution is determined to be less than the second threshold, or 100 dpi, and a print resolution warning is therefore displayed for the double-page spread P1. Note that, in this case, the warning process is appropriate since jaggies will be visually recognizable even if image editing, namely a blurring process, is performed.

Assume also that, in the above specific example, after the layout of the double-page spread P1 is determined, the user performs an editing operation to replace the image in the background image slot with a different image. In this case, the determination process in S902 causes the flow to proceed to S904. Thus, the print resolution is checked on the basis of the first threshold, or 200 dpi. Accordingly, a print resolution warning is more likely to be outputted. For example, if the user has performed an editing operation to replace the image in the background image slot with a different image, the image inserted in the background image slot may be difficult to view if a blurring process is performed thereon. For this reason, the user may possibly perform a manual operation to change the setting such that no image editing is performed. Even in this case, the image in the background image slot is still displayed enlarged, so that jaggies are visually recognizable. Thus, in this case, displaying a print resolution warning on the basis of the first threshold, or 200 dpi, is the appropriate warning process. Note that the setting may be automatically changed such that no image editing process is performed in a case where an image different from the foreground image is inserted, such as the case where the user performs an editing operation to insert a different image in the background slot.

Also, in another example, the user may possibly perform an editing operation to change the setting such that no image editing is performed, without replacing the image in the background image slot. In this case, jaggies are visually recognizable. Thus, it is desirable to check the print resolution by using the normal warning resolution. Then, in the determination in S902, whether image editing has been performed on the background image slot may further be determined, and the flow may proceed to S903 if image editing has been performed.

As described above, in this embodiment, in the case where a single image is allocated to a single double-page spread, the original image is laid out in the foreground image slot, and an image obtained by performing an image editing process to prevent jaggies is arranged in the background image slot. This embodiment further involves performing a process of lowering the threshold for outputting a print resolution warning for the background image slot. Accordingly, a print resolution warning is less likely to be displayed in the case where automatic layout is performed.

<Modification>

In the special template 600, described with reference to FIGS. 6A and 6B, the image editing for the background image slot 620 is fixed to a blurring process. However, the type or intensity of the image editing performed by the image editing unit 205 can be changed in accordance with the print resolution of the image arranged.

Description will be given of a specific example of changing the type or intensity of the image editing performed by the image editing unit 205 in accordance with the print resolution of the image arranged. In a case where the print resolution is 200 dpi, it is not less than the aforementioned predetermined threshold (print warning resolution). Since it is a resolution that does not cause jaggies, no image editing may be performed. Alternatively, free image editing may be designated with the emphasis on design. In a case where the print resolution is about 100 dpi, image editing that does not greatly change the original image, such as a blurring process or a transparency process, may be designated. In a case where the resolution is about 50 dpi, image editing that greatly changes the original image, such as a line art process or a halftone process, may be designated since it would otherwise be difficult to make an image in the first place. Also, in a case where the amount of blur in a blurring process or the like (the intensity of the image editing) can be adjusted using a parameter, the parameter may be changed in accordance with the resolution.

Embodiment 3

In embodiment 2, description has been given of an example where a special template is used in the case of arranging a certain number of images with which a print resolution warning is likely to be outputted, that is, in the case of arranging a single image on a double-page spread. In this embodiment, description will be given of an example where a special template is used in a case where a print resolution warning is determined to be outputted as a result of actually determining the layout. The configuration of an information processing apparatus 104 used in this embodiment is similar to that in embodiment 2, and description thereof is therefore omitted.

<Description of Process>

Figure 11:
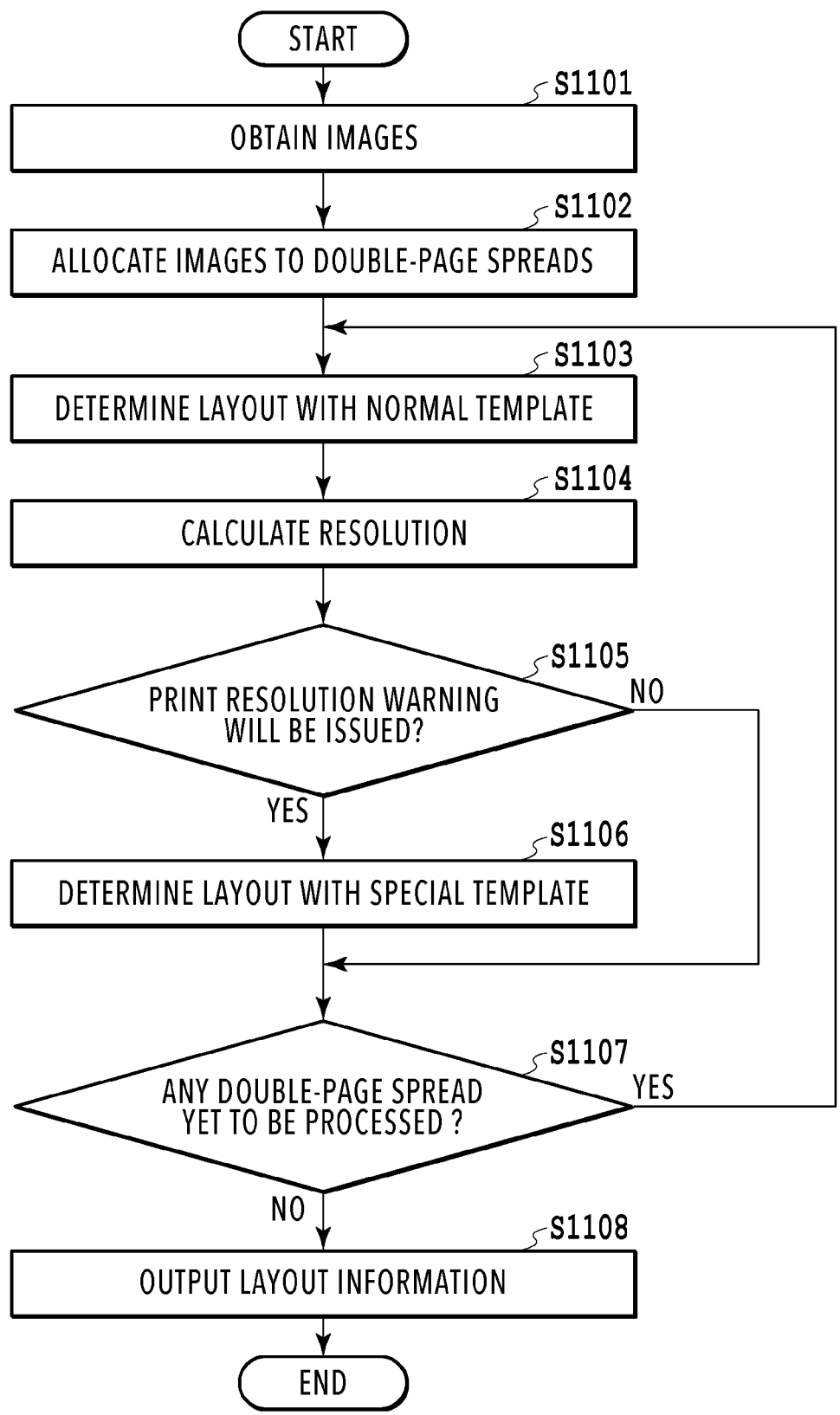
FIG. 11 is a flowchart of a layout determination process.

FIG. 11 is a diagram illustrating an example of a flowchart of a layout determination process in this embodiment. S1101 and S1102 are similar to S401 and S402 in FIG. 4 and description thereof is therefore omitted.

In S1103, the layout determination unit 204 lays out the one or more images by using a normal template. The content of the process is the same as S404 in embodiment 1.

Figures 12A, 12B:
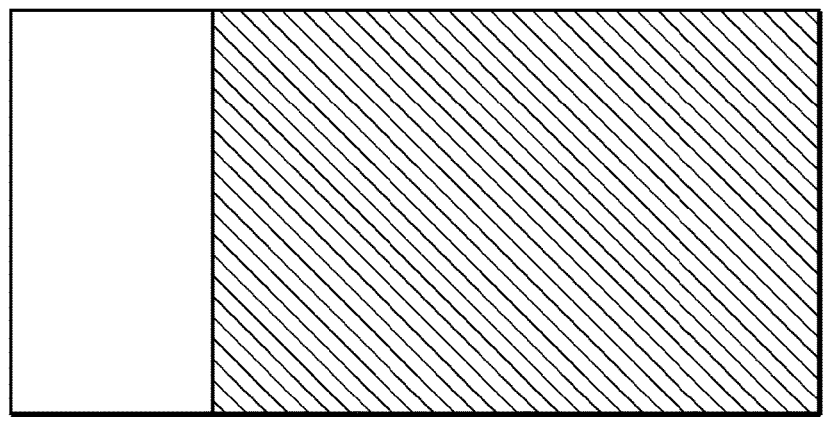
FIGS. 12A and 12B are diagrams explaining a normal template.

FIGS. 12A and 12B are diagrams explaining the normal template in this embodiment. In this embodiment, the template holding unit 203 also holds normal templates to be used in the case where the number of images allocated to the double-page spread is one. As described above, a normal template is used in S1103 regardless of whether the number of images is one or more than one.

In S1104, the layout information output unit 204 calculates the print resolution from the layout result. Specifically, the layout information output unit 204 calculates the print resolution of each image slot. The print resolution can be calculated using equation 1, as mentioned earlier.

In S1105, the layout determination unit 204 determines whether a print resolution warning will be outputted for the processing target double-page spread. Specifically, for each image slot in the processing target double-page spread, the layout determination unit 204 determines whether the print resolution of the image slot is less than the first threshold, or 200 dpi, which is the normal warning resolution. If there is even one image slot with a print resolution less than the normal first threshold, the flow proceeds to S1106. If the print resolutions of all image slots are more than or equal to the first threshold, the layout result is not problematic in terms of print resolution, and the flow therefore proceeds to S1107.

In S1106, the layout determination unit 204 lays out the images allocated to the processing target double-page spread by using the special template 600, illustrated in FIGS. 6A and 6B. The content of the process is the same as S405 in embodiment 1, and description thereof is therefore omitted.

The processes in S1007 and S1108 are similar to the processes in S406 and S407, and description thereof is therefore omitted.

By the above process, the layout of a photo album using images selected by the user is determined. Here, print resolution warning before printing is the same as the content described in embodiment 2, and is therefore omitted.

Specific Example

Assume a case of determining the layout using a single image of 3840×2160 px on the basis of the above-described process. In the layout process, the process of S1103 is performed to determine the layout using the normal template in FIGS. 12A and 12B. The size of the image slot is 260×150 mm. In this case, the print resolution calculated in S1104 is 375 dpi. Since this print resolution is not less than the first threshold, or 200 dpi, the determination of the layout of this processing target double-page spread is completed.

Assume, on the other hand, a case of determining the layout in the same manner using a single image of 1920× 1080 px. The print resolution calculated in S1104 is 188 dpi. Since this print resolution is less than the first threshold, or 200 dpi, it is determined in S1105 that there is an image below the warning resolution. As a result, the layout is determined using the special template 600 in S1106. In this case, the size of the foreground image slot is 120×67.5 mm and the size of the background image slot is 260×150 mm.

In a case of performing printing in this state, the print resolution is obtained in S901. The resolution of the foreground image slot is 406 dpi and the resolution of the background image slot is 188 dpi. In this case too, no resolution warning is outputted since the background image slot is checked with the warning resolution by using the second threshold, or 100 dpi, as described in embodiment 2.

In embodiments 1 and 2, whether to use a normal template or a special template is determined before the layout is determined. For this reason, a special template is used even for an image of 3840×2160 px, with which no resolution warning will be outputted.

On the other hand, embodiment 3 differs in that a normal template is used to lay out an image of 3840×2160 px, with which no resolution warning will be outputted, while a special template is used to lay out an image of 1920×1080 px, with which a resolution warning will be outputted.

As described above, in this embodiment, in the case of arranging an image with which no resolution warning will be outputted, the image is laid out using a normal template. In the case of arranging an image with which a resolution warning will be outputted, the image is laid out using a special template. Thus, for the background image, whose print resolution is likely to below the warning resolution, its warning resolution is lowered. Accordingly, the likelihood of outputting a print resolution warning is lowered. Also, even in a case where the print resolution is low, jaggies are not visually recognizable.

Note that, a plurality of special templates may be prepared in the process in S1106, and the processes in S1105 and S1106 may be repeated. For example, a plurality of special templates such as a special template T1 suitable for laying out an image of about 100 dpi and a special template T2 suitable for laying out an image of about 50 dpi may be prepared. Then, for example, the images may be laid out using the special template T1 and, if a resolution warning is determined to be outputted with that layout result, the special template T2 may be used instead to reduce the likelihood of outputting a resolution warning. Also, in the case where a resolution warning is determined to be outputted after laying out the images using a special template, the image editing effect may be changed to use image editing with a lower warning resolution.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present disclosure, it is possible to provide a layout with a high user satisfaction.

This application claims the benefit of Japanese Patent Application No. 2018-082418, filed Apr. 23, 2018, which is hereby incorporated by reference herein in its entirety.

What is claimed is:

1. An image processing apparatus comprising:
   an obtaining unit configured to obtain a plurality of images;
   a division unit configured to divide the obtained plurality of images into a plurality of groups;
   a determination unit configured to determine a processing target group and a template to be used for the processing target group; and
   an arranging unit configured to arrange an image included in the processing target group into a slot of the template determined by the determination unit,
   wherein in a case where the number of images in the processing target group is one, (a) the determination unit determines a first template as the template to be used for the processing target group, the first template including a first slot and a second slot overlapping the first slot, and (b) the arranging unit arranges a first image based on the one image into the first slot and a second image based on the one image into the second slot.

2. The image processing apparatus according to claim 1, wherein a size of the first image arranged in the first slot of the first template is larger than a size of the second image arranged in the second slot of the first template.

3. The image processing apparatus according to claim 1, wherein the division unit divides the plurality of images into the plurality of groups on a basis of the number of double-page spreads, and the determination unit determines a template for a processing target double-page spread to be used for the processing target group.

4. The image processing apparatus according to claim 1, further comprising:
   a notification unit configured to notify of a message in a case where resolution of the image arranged by the arranging unit is less than a predetermined threshold; and
   a threshold changing unit configured to change the threshold in accordance with the template determined by the determination unit.

5. The image processing apparatus according to claim 1, further comprising an editing unit configured to perform an image editing process that suppresses jaggies in the first image arranged in the first slot in a case where the number of images in the processing target group is one.

6. The image processing apparatus according to claim 5, wherein a type of the image editing process performed by the editing unit is designated in the template determined by the determination unit.

7. The image processing apparatus according to claim 5, wherein the editing unit changes a type or intensity of the image editing process to be performed by the editing unit in accordance with resolution of the first image arranged in the first slot.

8. The image processing apparatus according to claim 6, wherein the editing unit performs an image editing process including at least one of a blurring process, a gradient mask process, a transparency process, a line art process, and a halftone process.

9. The image processing apparatus according to claim 1, wherein the first image arranged in the first slot is an image obtained by enlarging the one image obtained by the obtaining unit.

10. The image processing apparatus according to claim 1, wherein in a case where the processing target group includes two or more images, the determination unit determines a second template as the template to be used for the processing target group, the second template being a template in which the images in the processing target group are arranged without overlapping each other.

11. The image processing apparatus according to claim 1, further comprising a notification unit configured to notify of a message in a case where resolution of the image arranged by the arranging unit is less than a predetermined threshold,
wherein the determination unit determines the first template as the template to be used for the processing target group in a case where the number of images in the processing target group is one and resolution of the one image obtained by using a template in which the one image is arranged in a single slot is less than the threshold.

12. A layout method comprising:
obtaining a plurality of images;
dividing the obtained plurality of images into a plurality of groups;
determining a processing target group and a template to be used for the processing target group; and
arranging an image in the processing target group into a slot of the template determined in the determining,
wherein in a case where the number of images in the processing target group is one, (a) in the determining, a first template including a first slot and a second slot overlapping the first slot is determined as the template to be used for the processing target group, and (b) in the arranging, a first image based on the one image is arranged into the first slot and a second image based on the one image is arranged into the second slot.

13. The layout method according to claim 12, wherein a size of the first image arranged in the first slot of the first template is larger than a size of the second image arranged in the second slot of the first template.

14. The layout method according to claim 12, wherein in the dividing, the plurality of images are divided into the plurality of groups on a basis of the number of double-page spreads, and
wherein in the determining, a template for a processing target double-page spread to be used for the processing target group is determined.

15. The layout method according to claim 12, further comprising:
notifying of a message in a case where resolution of the image arranged in the arranging is less than a predetermined threshold; and
changing the threshold in accordance with the template determined in the determining.

16. The layout method according to claim 12, further comprising performing an image editing process that suppresses jaggies in the first image arranged in the first slot in a case where the number of images in the processing target group is one.

17. The layout method according to claim 16, wherein a type of the image editing process performed in the performing is designated in the template determined in the determining.

18. The layout method according to claim 16, wherein in the performing, a type or intensity of the image editing process to be performed in the performing is changed in accordance with resolution of the first image arranged in the first slot.

19. The layout method according to claim 17, wherein in the performing, an image editing process including at least one of a blurring process, a gradient mask process, a transparency process, a line art process, and a halftone process is performed.

20. The layout method according to claim 12, wherein the first image arranged in the first slot is an image obtained by enlarging the one image obtained in the obtaining.

21. The layout method according to claim 12, wherein in the determining, in a case where the processing target group includes two or more images, a second template is determined as the template to be used for the processing target group, the second template being a template in which the images in the processing target group are arranged without overlapping each other.

22. The layout method according to claim 12, further comprising notifying of a message in a case where resolution of the image arranged in the arranging is less than a predetermined threshold,
wherein in the determining, the first template is determined as the template to be used for the processing target group in a case where the number of images in the processing target group is one and the resolution of the one image obtained by using a template in which the one image is arranged in a single slot is less than the threshold.

* * * * *